United States Patent [19]
Bizot et al.

[11] Patent Number: 5,279,165
[45] Date of Patent: Jan. 18, 1994

[54] METHOD AND DEVICE FOR THE MEASUREMENT OF WIND-RELATED STRESSES ON A ROTATING SYSTEM

[75] Inventors: Alain Bizot, Antony; André Peyrat, Montrouge, both of France

[73] Assignee: Thomson - CSF, Puteaux, France

[21] Appl. No.: 901,976

[22] Filed: Jun. 22, 1992

[30] Foreign Application Priority Data

Jun. 27, 1991 [FR] France ................ 91 08012

[51] Int. Cl.$^5$ .......................................... G01M 19/00
[52] U.S. Cl. ...................................... 73/786; 342/173
[58] Field of Search ............. 73/760, 786, 170.08, 73/862.193; 342/173, 174

[56] References Cited

U.S. PATENT DOCUMENTS

| | | | |
|---|---|---|---|
| 3,984,788 | 10/1976 | Peyrat | 331/107 R |
| 4,155,252 | 5/1979 | Morrill | 73/170.08 |
| 5,053,777 | 10/1991 | Peyrat | 342/173 |

FOREIGN PATENT DOCUMENTS

0324281 7/1989 European Pat. Off. .
2541639 8/1984 France .

OTHER PUBLICATIONS

Dull, Hans-Jurgen, "New Antenna Drives," Siemens Power Engineering, vol. 6, No. 2, Mar. 1984, pp. 98–101.

Primary Examiner—Jerry W. Myracle
Attorney, Agent, or Firm—Pollock, Vande Sande & Priddy

[57] ABSTRACT

Disclosed are a method and a device to measure wind-related stresses in a rotating system. It is based on the studies made by the Applicant which have shown that the power given by the motors driving the system rotationally are a function of these stresses. A measurement of the power, or of any quantity characteristic of this power (such as current, cos$\phi$ pressure, etc.) therefore enables a simple measurement of the wind-related stresses. If we set a limit value of power (or of a characteristic quantity) related to the limit velocity of the wind beyond which the forces to which the system is subjected are excessive, it becomes easy, by way of a comparison, to obtain a condition for the operation of the motors. The disclosure can also be used, in systems carrying out an angle measurement, to make a correction of this measurement.

13 Claims, 3 Drawing Sheets

METHOD AND DEVICE FOR THE MEASUREMENT OF WIND-RELATED STRESSES ON A ROTATING SYSTEM

BACKGROUND OF THE INVENTION

1. Field of the Invention

The present invention relates to a method and a device for the measurement of wind-related stresses on a rotating system, notably for a radar with rotating antennas.

A particular field of application of the invention relates to radars set up on the ground and used to detect moving targets of all types, said radars comprising a system of rotating antennas without protection against the effects of the wind. For such radars, the effects of the wind have two main consequences:

The forces due to the wind, to which the system is subjected, are such that it is desirable to stop the rotational driving of the antennas beyond a certain wind velocity, typically between 120 and 130 km/h, in so as to prevent any risk of deterioration and premature wearing out of the rotary plate that supports the antennas and the motor drive system;

Even below this wind velocity limit, there is a deformation, or torsion, of the system of antennas that modifies their radiation characteristics and leads to an error in the measurement of the azimuthal angle of the detected targets.

2. Description of the Prior Art

A known way of permanently measuring the velocity of the wind uses anemometrical sensors which trigger the stopping of the drive motors of the rotary plate and their uncoupling as soon as the prescribed limit is reached, so that the system of antennas can take its orientation freely as dictated by the wind. However, the measurement made by these sensors is generally distorted by the proximity of the antennas. Furthermore, the adding on of these sensors, which are positioned externally and are quite naturally connected to the electronic circuitry of the radar, significantly increases the risk of the propagation of lightning into this electronic circuitry.

With respect to the strain related to the deformation of the system of antennas, specialists have had either to shield the system by means of radomes that are permeable to the radar waves and are rain-proof and wind-proof, or to strengthen the mechanical structures of the antennas. However, neither of these two approaches is entirely satisfactory, the former because the radome necessarily contributes disturbance to the radiation of the antennas and the latter because it is incompatible with the imperatives of weight and cost.

SUMMARY OF THE INVENTION

A first aim of the invention is to propose a simple method for the measurement, for example the permanent measurement, of wind-related stresses without the above-mentioned drawbacks.

A second aim of the invention is to use this measurement to correct the error made in the measurement of the azimuthal angle of the detected target, as well as to trigger the stopping of the drive motors and their uncoupling when the limit velocity of the wind is reached.

Studies made by the Applicant have shown that the power provided by the motor drive system is a function of the wind-related stresses and that a measurement of this power, or of a quantity characteristic of this power, would therefore constitute a measurement of these stresses.

More specifically, the invention relates to a method for the measurement of wind-related stresses affecting a rotating system, rotationally driven by a motor, said method consisting in:

measuring a quantity characteristic of the power provided by the motor;

computing the difference between the maximum characteristic quantity and the minimum characteristic quantity in at least one rotation of the rotating system, said difference constituting a measurement of the wind-related stresses.

The invention also relates to a device for the measurement of wind-related stresses for a rotating system driven rotationally by at least one motor controlled by control means, wherein said device comprises:

means to measure a quantity characteristic of the power provided by the motor;

means to compute the maximum difference existing in the measurement of said characteristic quantity on at least one rotation of the rotating system.

BRIEF DESCRIPTION OF THE DRAWINGS

The invention, as well as its advantages, will be understood more clearly from the following description, made with reference to the appended drawings, of which.

MORE DETAILED DESCRIPTION

Figure 1:
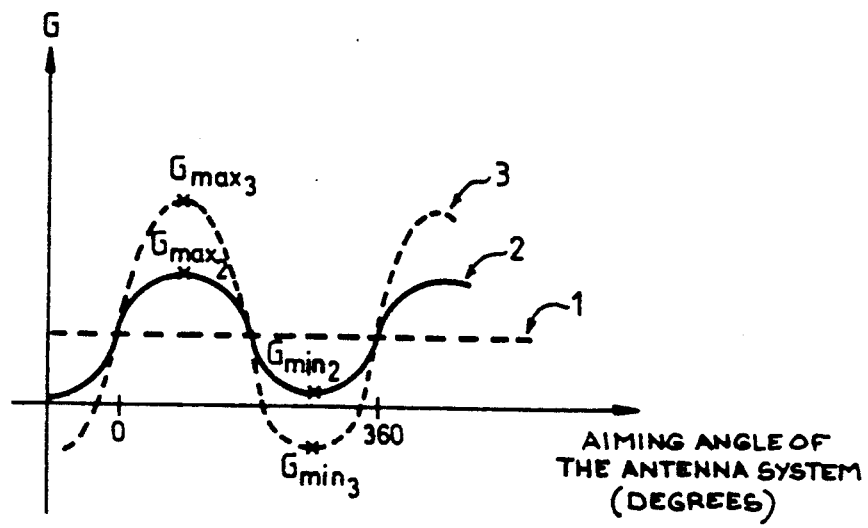
FIG. 1 represents the power given by the drive motor as a function of the aiming angle of a system comprising an antenna when the wind is zero, low or high.

FIG. 1 is the result of a study by the Applicant. It represents the power given by a drive motor of a system comprising an antenna as a function of the aiming angle of this antenna system, in three different configurations of wind velocity:

In the case of the curve 1, the wind is zero. Consequently, the power required to drive the antenna rotationally at the specified rotation velocity is constant, irrespectively of the direction in which the antenna system is aimed.

By contrast, when the wind blows, it slows down or accelerates the movement of the antenna system depending on the way in which this antenna system is oriented with respect to the direction of the wind. The result thereof, depending on the angle between the direction of the wind and the aiming direction of the antenna system, is a variation of the power needed to carry out the rotation. This variation in power is greater or smaller depending on the force of the wind, as can be seen from the curves 2 and 3 of FIG. 1 which respectively show the variations in power when the wind is low and when the wind is high.

The curves 2 and 3 show respectively maximum values $P_{max2}$ and $P_{max3}$ and minimum values $P_{min2}$ and $P_{min3}$ depending on whether or not the direction of the wind is opposite to the aiming direction of the antenna system.

Figure 2:
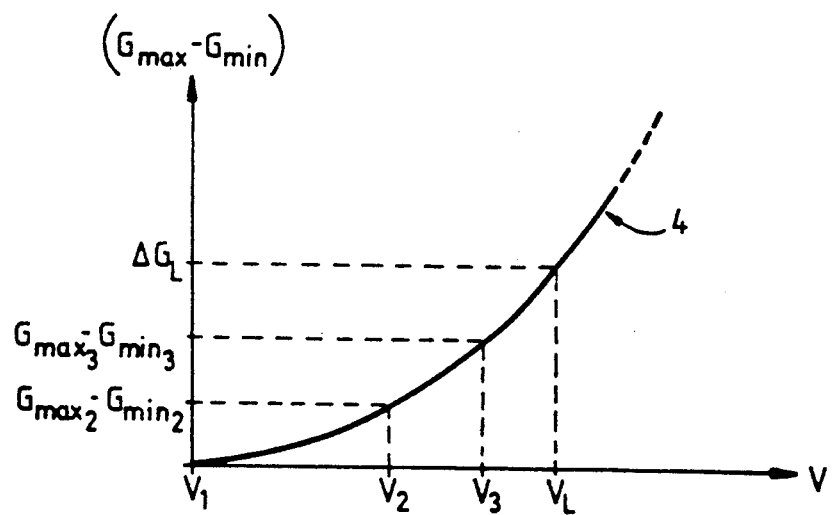
FIG. 2 illustrates the relationship between the maximum variation in power required in one rotation of the antenna and the velocity of the wind.

For each curve, the difference between the maximum power and the minimum power given on one rotation is a function of the velocity of the wind, as is shown by the curve 4 of FIG. 2 on which the velocities $V_1$, $V_2$ and $V_3$, corresponding respectively to the curves 1, 2 and 3 of FIG. 1, are represented.

The invention thus proposes a very simple method for the measurement of wind-related stresses which uses the rotating system itself without any addition of external sensors. Should the motor drive system used to drive the rotating system be electrical, the operation to be done is a simple measurement of the current used by this motor drive system followed by a computation of the difference between the maximum current and the minimum current in one rotation of the antenna system. If the phase shift between the current in a motor and the voltage at the terminals of this motor is designated by $\phi$, a measurement of $\cos\phi$ instead of the measurement of the current may also be made.

If the motor drive system used is hydraulic, the measurement of power may be replaced by a measurement of the differences in pressure of the hydraulic fluid used.

The measurement of wind-related stresses through the measurement of a characteristic quantity G which, as stated here above, may be the power of the motors, the current, the $\cos\phi$ or again the pressure, is very promising in the applications that can be made thereof:

To determine the instant for which the limit velocity $V_L$ of the wind is reached, it is enough to compare the difference $\Delta G$ between the maximum characteristic quantity and the minimum characteristic quantity given in one rotation of the antenna system at a threshold value $\Delta G_L$ characteristic of $V_L$ (see FIG. 2).

When the two values $\Delta G$ and $\Delta G_L$ are equal, it is then necessary to stop the motor drive system for a predetermined time, and allow the antenna system to get oriented freely.

Figure 3A:
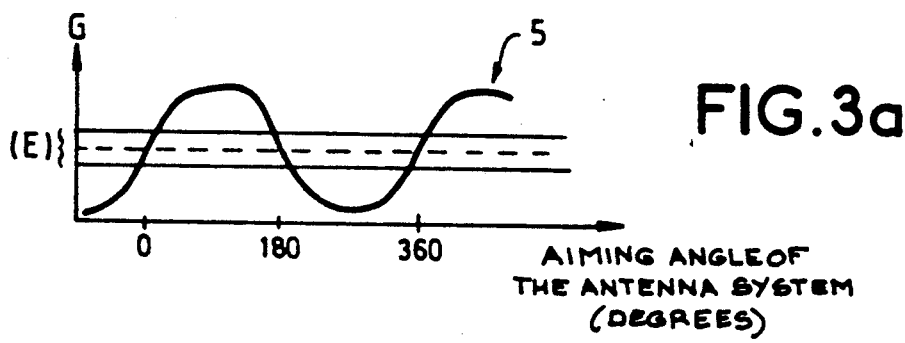
FIGS. 3a to 3e respectively show the variations in the instantaneous power given by the motor drive system as a function of the aiming angle of the antenna, the angle error made in the measurement of the azimuthal angle of a detected target, the theoretical curve of compensation of this error as well as the curves of over-compensation and under-compensation.

The second promising feature of the measurement of the instantaneous characteristic quantity lies in the possibility of correcting the error made on the measurement of the azimuthal angle of the detected target:

In FIG. 3a, the curve 5 represents the variations of the characteristic quantity as a function of the aiming angle of the antenna system expressed in degrees, under particular wind conditions.

Figure 3B:
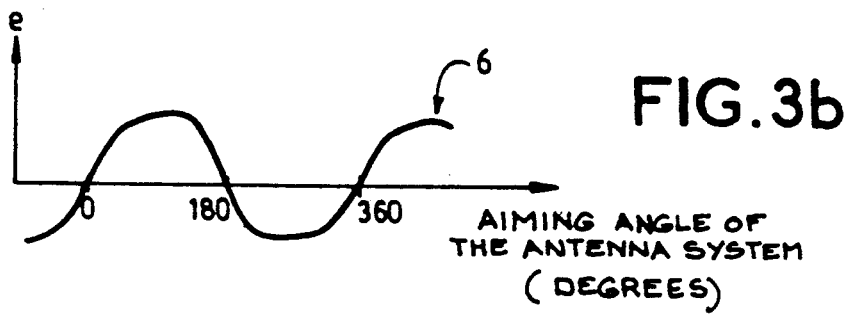
Figure 3C:
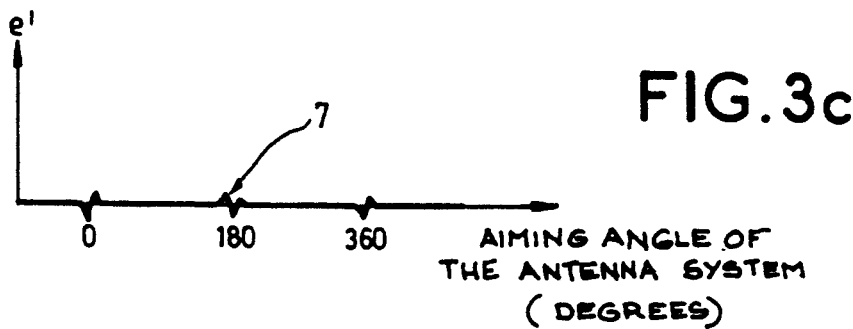

The dashed line illustrates the case for which the wind is zero. In FIG. 3b, the curve 6 represents the angle error e due to the torsion as a function of the aiming angle of the antenna system. This error is zero when the value of G is equal to the value that would have been had if the wind had been zero, which corresponds to the aiming angles 0°, 180° and 360° in this specific case. In FIG. 3c, the curve 7 illustrates the compensation for the above angle error. The non-zero values at 0°, 180° and 360° result from the fact that, in practice, it is possible to do without having to achieve a compensation when the characteristic quantity G measured remains close (E) to that corresponding to the zero wind (see FIG. 3a).

Figure 3D:
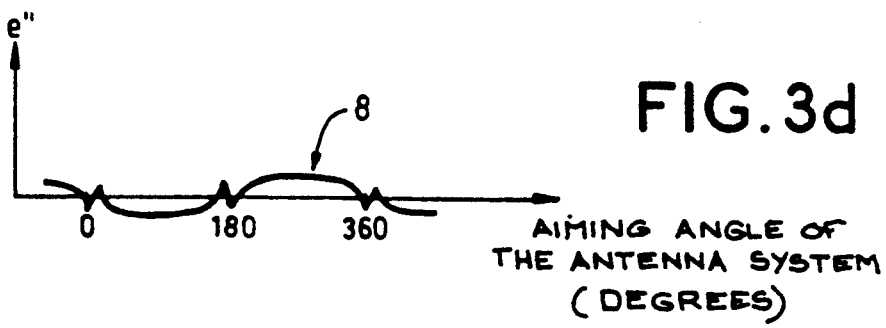
Figure 3E:
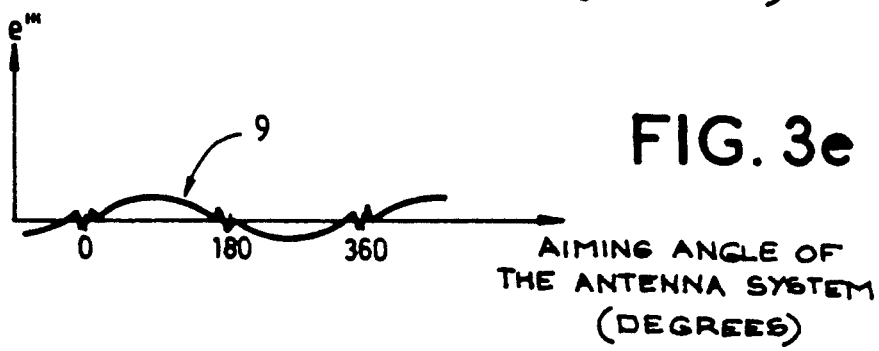

Furthermore, the practical knowledge of the relationship between G and the angle error e is obtained after computations, simulations, wind tunnel tests and field measurements which give only an imperfect estimation of this relationship. Consequently, the compensation of FIG. 3c is rarely obtained. What is obtained rather is either an over-compensation illustrated by the curve 8 of FIG. 3d or an under-compensation as can be seen in the curve 9 of FIG. 3e.

Figure 4:
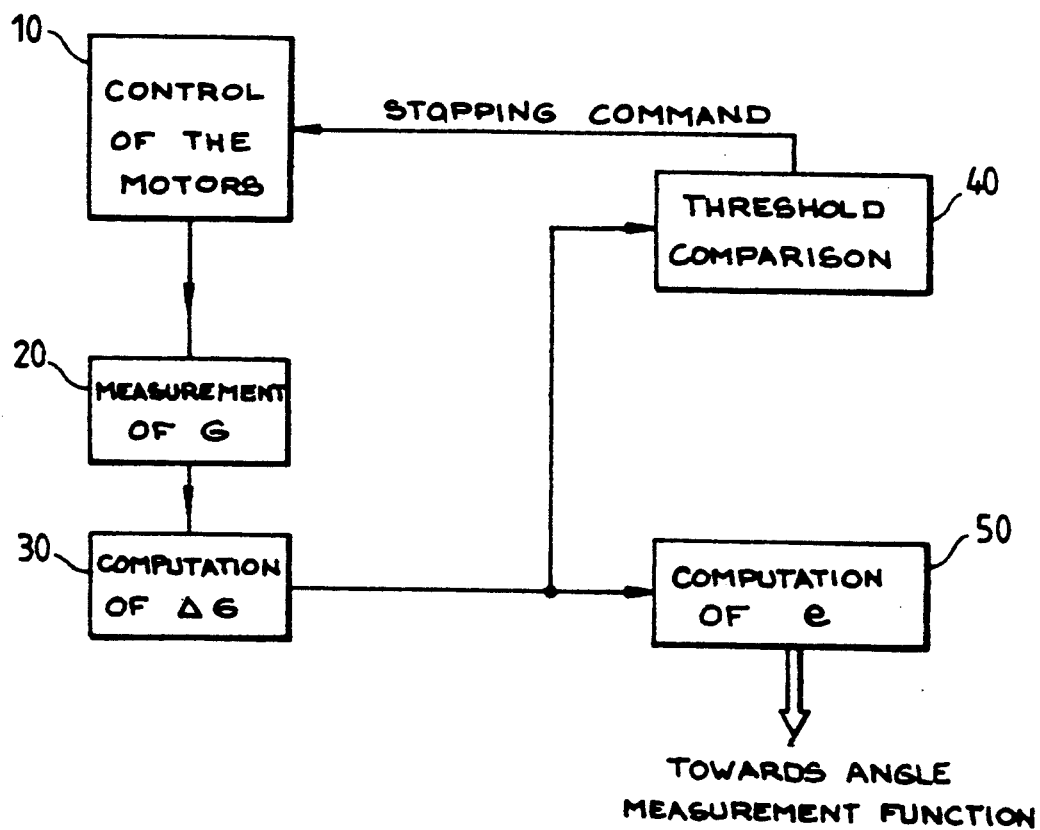
FIG. 4 is a block diagram of a possible embodiment of a device for the measurement of wind-related stresses according to the invention.

FIG. 4 shows a possible embodiment, in the form of a block diagram, of a device for the measurement of wind-related stresses for a rotating system. The rotating system considered has means 10 to control a motor drive system comprising one or more motors. The device according to the invention comprises means 20 to measure a quantity G characteristic of the power given by the drive system. The different measurements made by the measurement means 20 are then given to means 30 for computing the maximum difference $\Delta G$ existing in the measurements of G for at least one rotation. If this difference represents a wind velocity higher than the velocity tolerated by the system, the device according to the invention provides for safety by the use of means 40, for the comparison of the difference $\Delta G$ with the limit difference $\Delta G_L$, which send a stopping command to the control means 10 of the motor drive system. Provision is also made, in the device, for the computing of the error e by a device 50. As shown in FIG. 4, this computation may be used to correct the angle measurement function of a radar system.

The invention and its applications have been described for a system comprising an antenna, which in no way constitutes a limitation. Indeed, the invention can be applied to any rotating system as, for example, in the case of a secondary antenna for which the antenna is placed above the antenna of the primary radar, the latter thus acting as a support for it. Naturally, the curves representing the characteristic quantity G chosen and the azimuthal angle error as a function of the aiming angle of the system of antennas have a more complex shape than in the case of a single antenna, and the curve connecting the angle error to the angular position of the system of antennas is generally different from the curve corresponding to the power given to both the antennas. Only a partial compensation is then possible for each of the two antennas.

What is claimed is:

1. A method for the measurement of wind-related stresses affecting a rotating system, rotationally driven by a motor, said method consisting in:
   measuring a quantity characteristic of the power provided by the motor;
   computing the difference between the maximum characteristic quantity and the minimum characteristic quantity given in at least one rotation of the rotating system, said difference constituting a measurement of the wind-related stresses.

2. A method for the measurement of wind-related stresses according to claim 1, wherein said motor is electrical and wherein the characteristic quantity is is the current consumed by the motor.

3. A method for the measurement of wind-related stresses according to claim 1, wherein said motor is electrical and wherein the characteristic quantity is is the cosine of the phase shift between the current in the motor and the voltage at the terminals of this motor.

4. A method for the measurement of wind-related stresses according to claim 1, wherein said motor is hydraulic and wherein the characteristic quantity is the pressure.

5. A method for the measurement of wind-related stresses according to any of the claims 1, 2, 3 or 4, further comprising a step for the comparison of said measurement with a threshold value characterizing the limit velocity of the wind beyond which it is necessary to stop the motor and detach the rotating system.

6. A method for the measurement of wind-related stresses according to claim 5, further comprising a step of compensation for the azimuthal angle error.

7. A method for the measurement of wind-related stresses according to claim 5, wherein the measurement of the characteristic quantity is done permanently.

8. A method for the measurement of wind-related stresses according to any of the claims 1, 2, 3 or 4, further comprising a step of compensation for the azimuthal angle error.

9. A method for the measurement of wind-related stresses according to claim 8, wherein the measurement of the characteristic quantity is done permanently.

10. A method for the measurement of wind-related stresses according to any of the claims 1, 2, 3 or 4, wherein the measurement of the characteristic quantity is done permanently.

11. A device for the measurement of wind-related stresses for a rotating system driven rotationally by at least one motor controlled by control means, wherein said device comprises:
 means to measure a quantity characteristic of the power provided by the motor;
 means to compute the maximum difference existing in the measurement of said characteristic quantity in at least one rotation of the rotating system.

12. A device for the measurement of wind-related stresses according to claim 11, further comprising means to compare the maximum difference with a threshold value to send a stopping command to the control means if this difference is greater than a threshold value.

13. A device for the measurement of wind-related stresses according to either of the claims 11 or 12, further comprising means to compute the aiming error of the rotating system.

* * * * *